United States Patent
Lee

(10) Patent No.: US 8,986,879 B2
(45) Date of Patent: Mar. 24, 2015

(54) POUCH TYPE RECHARGEABLE BATTERY

(75) Inventor: Hyung Bok Lee, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1799 days.

(21) Appl. No.: 11/239,076

(22) Filed: Sep. 30, 2005

(65) Prior Publication Data

US 2007/0196733 A1     Aug. 23, 2007

(30) Foreign Application Priority Data

Oct. 1, 2004  (KR) .................. 10-2004-0078189

(51) Int. Cl.
*H01M 2/08*    (2006.01)
*H01M 10/0525* (2010.01)
*H01M 2/02*    (2006.01)

(52) U.S. Cl.
CPC .............. *H01M 2/08* (2013.01); *H01M 2/0275* (2013.01); *H01M 10/0525* (2013.01); *Y02E 60/122* (2013.01)
USPC .......................................... 429/185; 429/178

(58) Field of Classification Search
None
See application file for complete search history.

(56) References Cited

U.S. PATENT DOCUMENTS

| | | | |
|---|---|---|---|
| 6,319,630 B1 * | 11/2001 | Hasegawa et al. | 429/162 |
| 6,451,476 B1 * | 9/2002 | Chang et al. | 429/127 |
| 2003/0017388 A1 * | 1/2003 | Furusaki | 429/162 |
| 2003/0232236 A1 | 12/2003 | Mitchell et al. | |
| 2004/0048149 A1 * | 3/2004 | Gross et al. | 429/127 |
| 2004/0118710 A1 * | 6/2004 | Bourque et al. | 206/219 |
| 2005/0069763 A1 | 3/2005 | Hong et al. | |
| 2005/0069766 A1 * | 3/2005 | Takahashi | 429/189 |

FOREIGN PATENT DOCUMENTS

| | | |
|---|---|---|
| JP | 2001-325925 | 11/2001 |
| JP | 2001-357824 | 12/2001 |
| JP | 2002-319375 | 10/2002 |
| JP | 2003-157811 | 5/2003 |
| JP | 2003-223874 | 8/2003 |
| JP | 2003-338281 | 11/2003 |
| JP | 2003-346779 | 12/2003 |
| JP | 2004-127850 | 4/2004 |
| KR | 2003-0034738 | 5/2003 |
| KR | 2003-0038078 | 5/2003 |
| KR | 2005-0036466 | 4/2005 |

OTHER PUBLICATIONS

"Integral." Merriam-Webster Online Dictionary. 2009. Merriam-Webster Online. Sep. 2, 2009 <http://www.merriam-webster.com/dictionary/integral>.*
Non-Final Office Action issued Nov. 18, 2009 in U.S. Appl. No. 12/487,898.

(Continued)

*Primary Examiner* — A. Eggerding
(74) *Attorney, Agent, or Firm* — H.C. Park & Associates, PLC

(57) ABSTRACT

A pouch type rechargeable battery that comprises an electrode assembly comprising a first electrode, a second electrode, and a separator interposed between the first and second electrodes is disclosed. The battery further comprises a pouch case comprising a case cover and a case body that is formed with a space for receiving the electrode assembly therein and a sealing part that is formed around the space. The sealing part comprises side sealing sections where the width of each side sealing section is less than the depth of the space.

14 Claims, 5 Drawing Sheets

(56) References Cited

OTHER PUBLICATIONS

Non-Final Office Action issued Aug. 28, 2009 in U.S. Appl. No. 12/487,898.
Final Office Action issued May 21, 2010 in U.S. Appl. No. 12/487,898.
Non-Final Office Action of Feb. 22, 2011 in U.S. Appl. No. 12/487,898.
Final Office Action dated Jul. 22, 2011 in U.S. Appl. No. 12/487,898.
Non-Final Office Action for corresponding U.S. Appl. No. 12/487,898 dated Jan. 24, 2013.
Final Office Action for corresponding U.S. Appl. No. 12/487,898 dated Jun. 20, 2013.

* cited by examiner

POUCH TYPE RECHARGEABLE BATTERY

CROSS REFERENCE TO RELATED APPLICATION

This application claims priority to and the benefit of Korean Patent Application No. 10-2004-0078189, filed on Oct. 1, 2004, which is hereby incorporated by reference for all purposes as if fully set forth herein.

BACKGROUND OF THE INVENTION

1. Field of the Invention

The present invention relates to a pouch type rechargeable battery. In particular, the present invention relates to a pouch type rechargeable battery that can emit gas that is generated therein when the rechargeable battery is overcharged or exposed to a high-temperature atmosphere and can also improve workability when installed in a battery pack.

2. Description of the Prior Art

Recently, as portable electronic devices have become increasingly compact and lightweight, the batteries that are used as power sources for these devices are being fabricated in compact sizes with high power storage capacity. For example, lithium ion rechargeable batteries have an operational voltage of more than 3.6 V, which is about three times that of Ni—Cd batteries or Ni—MH batteries that are used as power sources for portable electronic devices. In addition, the lithium ion rechargeable batteries have high energy density per unit weight so they are extensively used in the advanced electronic technology fields.

A lithium ion rechargeable battery generates electrical energy based on a set of oxidation-reduction reactions that occur at a positive electrode and a negative electrode. The lithium ion battery includes positive electrode active materials and negative electrode active materials that are capable of reversibly intercalating the lithium ions into or deintercalating the lithium ions from the positive electrode and negative electrode. The battery further includes an organic electrolyte or a polymer electrolyte that is filled between the positive electrode and the negative electrode.

The rechargeable batteries may be fabricated in various shapes and are classified according to external appearances of the cases that hold the electrode assemblies. For example, cylinder-type rechargeable batteries use cylindrical aluminum cans, square type rechargeable batteries use square type aluminum cans, and pouch type rechargeable batteries are housed in a laminated pouch case.

FIG. 1 is a perspective view that illustrates a conventional pouch type rechargeable battery.

Referring to FIG. 1, the conventional pouch type rechargeable battery includes an electrode assembly 10 and a pouch case 20 that receives and seals the electrode assembly 10. The electrode assembly 10 has a first electrode 12, a second electrode 14, and a separator 13 that is interposed between the first electrode 12 and second electrode 14. The components of the electrode assembly are stacked in the form of a stacked-type electrode assembly or wound in a jelly roll type electrode assembly. First electrode tab 15 and second electrode tab 16 extend from one side of an electrode plate of the electrode assembly 10, respectively, such that some parts of the first electrode tab 15 and second electrode tab 16 are exposed outside a pouch case 20. Protective tapes 17 are attached to the first electrode tab 15 and second electrode tab 16.

The pouch case 20 includes a case cover 22 and a case body 24 that have a space 25 for receiving the electrode assembly 10 therein. At least one side portion of the case body 24 is integrally connected with at least one side portion of the case cover 22. Remaining side portions of the case body 24 may form side sealing sections 24a and an upper sealing section 24b around the space 25 to receive the electrode assembly 10.

When the electrode assembly 10 is placed in the space 25 of the case body 24, the case body 24 makes contact with the case cover 22. The side sealing sections 24a and the upper sealing section 24b are thermally bonded to the case cover 22, thereby securely sealing the case body 24.

In order to reduce the volume of the pouch type rechargeable battery when it is accommodated in a battery pack, the side sealing sections 24a are folded toward both sides of the case body 24. As consumers may require round type portable electronic devices, the pouch type rechargeable battery must also be accommodated in a round type battery pack. At this time, edges of the side sealing sections 24a may scratch or dent the battery pack, thereby lowering the efficiency of a battery pack manufacturing process.

In addition, if a pouch type rechargeable battery is overcharged or exposed to a high-temperature atmosphere, the electrolyte may react with an active material layer of an electrode plate or the electrolyte. The active material layer may dissolve in the electrolyte, is thereby generating gas in the pouch case 20. Accordingly, the temperature and internal pressure of the pouch type rechargeable battery may rise, thereby causing a fire or an explosion of the pouch type rechargeable battery.

SUMMARY OF THE INVENTION

The present invention provides a pouch type rechargeable battery that can easily emit gas that is generated therein when the rechargeable battery is overcharged or exposed to a high-temperature atmosphere. The configuration of the present pouch type rechargeable battery may improve workability during molding of the battery or when installing the battery in a battery pack by adjusting widths of side sealing sections of a pouch case.

Additional features of the invention will be set forth in the description which follows, and in part will be apparent from the description, or may be learned by practice of the invention.

The present invention discloses a pouch type rechargeable battery comprising an electrode assembly comprising a first electrode, a second electrode, and a separator that is interposed between the first electrode and second electrodes. The battery further comprises a pouch case including a case cover and a case body that is formed with a space for receiving the electrode assembly therein and a sealing part formed around the space. The sealing part comprises side sealing sections and the width of each side sealing section is less than the depth of the space.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 2b is a perspective view of a pouch type rechargeable battery shown in FIG. 2a.

FIG. 3b is a perspective view of a pouch type rechargeable battery shown in FIG. 3a.

FIG. 4b is a perspective view of a pouch type rechargeable battery shown in FIG. 4a.

DETAILED DESCRIPTION OF THE ILLUSTRATED EMBODIMENTS

The pouch type rechargeable battery of the present invention comprises a pouch case that has side sealing sections in which the widths of the side sealing sections are adjusted so gas generated in the battery can easily be emitted when the pouch type rechargeable battery is overcharged or exposed to a high-temperature atmosphere. The present invention improves the molding process of the pouch type rechargeable battery and the installation of the pouch type rechargeable battery in the battery pack.

Figure 1:
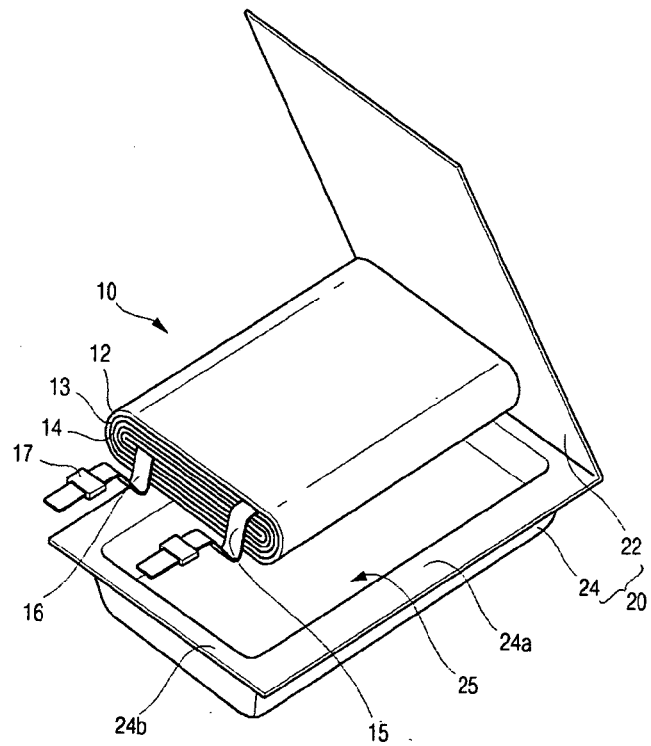
FIG. 1 is a perspective view of a conventional pouch type rechargeable battery.
Figure 2A:
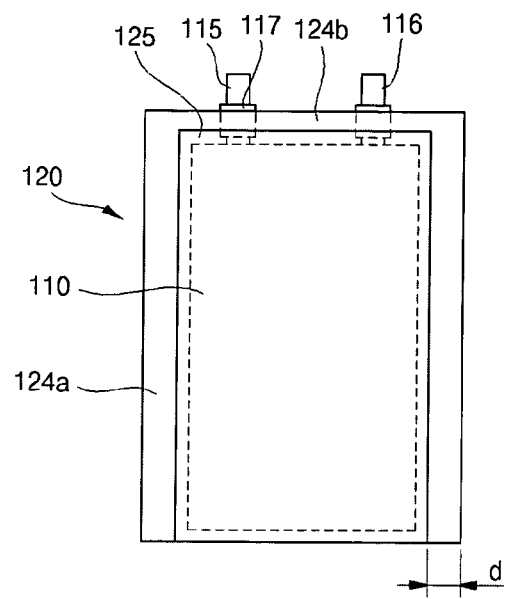
FIG. 2a is a plan view of a pouch type rechargeable battery according to an exemplary embodiment of the present invention.
Figure 2B:
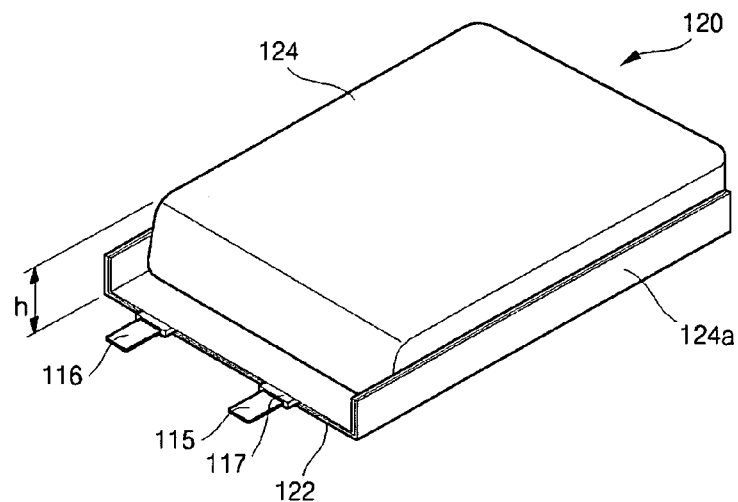

FIG. 2a is a plan view of a pouch type rechargeable battery according to an exemplary embodiment of the present invention. FIG. 2b is a perspective view of the pouch type rechargeable battery shown in FIG. 2a.

Referring to FIG. 2a and FIG. 2b, the pouch type rechargeable battery comprises an electrode assembly 110 and a pouch case 120 for receiving the electrode assembly 110. Although they are not shown in FIG. 2a and FIG. 2b, the electrode assembly 110 may include a first electrode, a second electrode, and a separator that is interposed between the first electrode and second electrode. These components of the electrode assembly are stacked in the form of a stack type electrode assembly or wound to form a jelly roll type electrode assembly.

The first electrode and the second electrode have opposite polarities and can be used as the positive electrode and the negative electrode, respectively. Each of the first electrode and second electrode includes an electrode current collector and electrode active materials including a positive active material and a negative active material that are coated on at least one surface of the electrode current collector.

If the first electrode or the second electrode is used as a positive electrode, the positive electrode current collector may comprise, but is not limited to stainless steel, nickel, aluminum, titanium or an alloy thereof. In addition, the positive electrode current collector may be obtained by surface-treating aluminum or stainless steel using carbon, nickel, titanium or silver, for example. Aluminum or an aluminum alloy is preferably used as the positive electrode current collector.

If the first electrode or the second electrode is used as a negative electrode, the negative electrode current collector may comprise but is not limited to stainless steel, nickel, copper, titanium or an alloy thereof. In addition, the negative electrode current collector can be obtained by surface-treating copper or stainless steel using carbon, nickel, titanium or silver, for example. Copper or a copper alloy is preferably used as the negative electrode current collector.

The positive electrode active material may include but is not limited to lithium-containing transition metal oxides or lithium-chalcogenide compounds. For example, the positive electrode active material includes metal oxides, such as $LiCoO_2$, $LiNiO_2$, $LiMnO_2$, $LiMn_2O_4$, or $LiNi_{1-x-y}Co_xM_yO_2$ where, $0 \leq x \leq 1$, $0 \leq y \leq 1$, $0 \leq x+y \leq 1$ and M is a metal including Al, Sr, Mg or La. The negative electrode active material may include but is not limited to carbon materials such as crystalline carbon, amorphous carbon, carbon composite, and carbon fiber, a lithium metal or a lithium alloy.

The separator prevents a short circuit between the first electrode and second electrode and provides a moving path of lithium ions. The separator may comprise a polyolefin based high polymer layer including polypropylene or polyethylene, a multiple layer thereof, a minute porous film, a woven fabric or a non-woven fabric, for example.

The first electrode tab 115 and the second electrode tab 116 may be coupled to the first electrode and second electrode of the electrode assembly 110, respectively using conductive adhesives, laser welding, ultrasonic welding, or resistance welding. The first electrode tab 115 and second electrode tab 116 protrude from the electrode assembly 110 in a direction perpendicular to the winding direction of the electrode assembly 110.

The electrode assembly 110 is housed in the pouch case 120 that includes a space 125. The pouch case 120 includes a case body 124 that is formed by pressing an external finishing member so that the space 125 for receiving the electrode assembly 110 is formed in the case body 124. A case cover 122 covering the case body 124 seals the space 125. A side portion of the case cover 122 extends from the case body 124 and sealing sections 124a and 124b are formed around the space 125 of the case body 124 so as to bond the case body 124 to the case cover 122. The case cover 122 is bonded to the sealing sections 124a and 124b, thereby sealing the space 125. A lower portion of the case cover 122 is integrally connected with the case body 124, so that three sealing sections including two side sealing sections 124a and one upper sealing section 124b are formed along three edge portions of the space 125.

The first electrode tab 115 and second electrode tab 116 of the electrode assembly 110 are drawn out through the upper sealing section 124b, which is opposite the lower portion of the case cover 122 and is integrally connected to the case body 124. Protective tapes 117 made from insulating materials are attached to the first electrode tab 115 and second electrode tab 116, respectively in order to prevent a short circuit between first electrode and second electrode. The side sealing sections 124a that extend from both sides of the upper sealing section 124b are folded towards both sides of the case body 124 in order to reduce the volume of the pouch type rechargeable battery when the pouch type rechargeable battery is housed in the battery pack.

In a pouch type rechargeable battery having the above-described structure, a width (d) of the side sealing section 124a of the case body 124 is smaller than a depth (h) of the space 125 of the case body 124. For example, the width (d) of the side sealing section 124a may be within a two-thirds (⅔) of the depth (h) of the space 125. The width (d) of the side sealing section 124a may preferable be within one half (½) of the depth (h) of the space 125, and more preferably, the width (d) of the side sealing section 124a may be within a one quarter (¼) of the depth (h) of the space 125.

The minimum width (d) of the side sealing section 124a can be adjusted by taking the adhesive strength of the side sealing section 124a into consideration. As the width (d) of the side sealing section 124a decreases, the gas that is generated in the pouch type rechargeable battery can be emitted rapidly to the environment. In addition, this configuration makes it easier to install the pouch type rechargeable battery in the battery pack. A molding resin material may also be easily introduced into an outer portion of the space of the case body to improve the molding process of the pouch type rechargeable battery.

As shown in FIG. 2b, when the side sealing sections 124a according to the present invention are folded towards both sides of the case body 124, they do not extend above the space of the case body 124. Accordingly, the volume of the pouch type rechargeable battery may be reduced. In addition, when the pouch type rechargeable battery is housed in the battery pack, lower edges of side sealing sections 124a do not scratch or dent the battery pack, thereby improving installation of the pouch type rechargeable battery in the battery pack. Furthermore, if the folded side sealing sections 124a do not extend above the space of the case body 124, the molding resin material may rapidly flow into an outer portion of the space of the case body 124 during molding, in particular, into a gap that is formed between the space of the case body 124 and the side sealing section 124a to improve the molding of the pouch type rechargeable battery.

In addition, as the width of the side sealing section 124a decreases, gas that is generated in the pouch type rechargeable battery when it is overcharged or exposed to high temperatures due to decomposition of the electrolyte may easily be emitted to the atmosphere through the side sealing sections 124a, thereby preventing a fire or an explosion of the pouch type rechargeable battery.

FIG. 3a, FIG. 4a, FIG. 5 and FIG. 6 are plan views of pouch type rechargeable is batteries according to other exemplary embodiments of the present invention. FIG. 3b and FIG. 4b are perspective views of the pouch type rechargeable batteries shown in FIG. 3a and FIG. 4a.

Figure 3A:
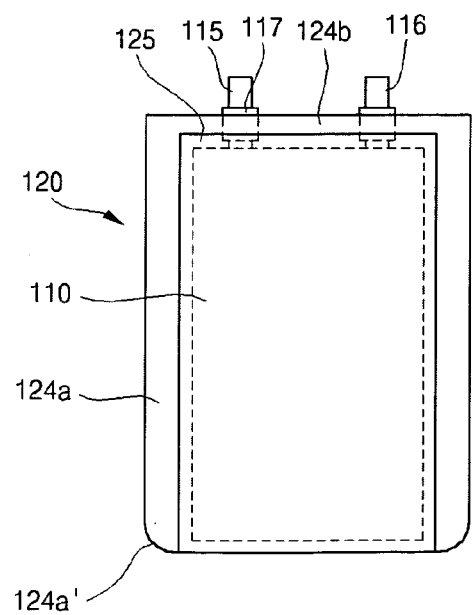
FIG. 3a, FIG. 4a, FIG. 5, and FIG. 6 are plan views of pouch type rechargeable batteries according to other exemplary embodiment of the present invention.
Figure 3B:
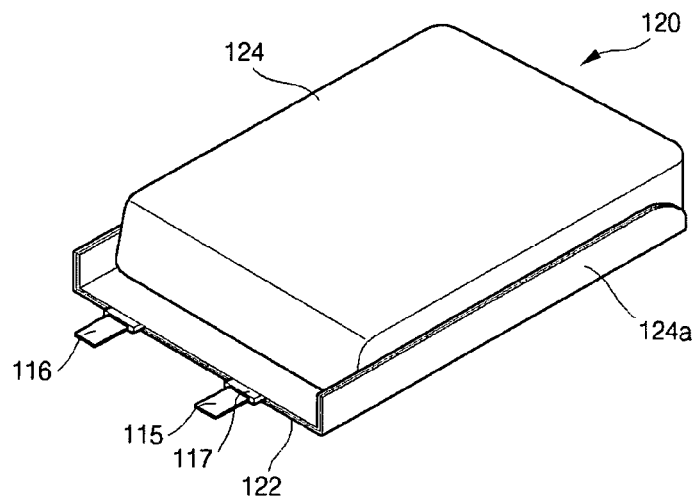

Referring to FIG. 3a and FIG. 3b, first edge portions 124a' of the side sealing sections 124a may be curved. In this case, the first end portions 124a' of the side sealing sections 124a may be shaped as a smooth curve when the side sealing sections 124a are folded 20 towards both sides of the case body 124, so that the battery pack will not be scratched or dented by the first end portions 124a' of the side sealing sections 124a.

Figure 4A:
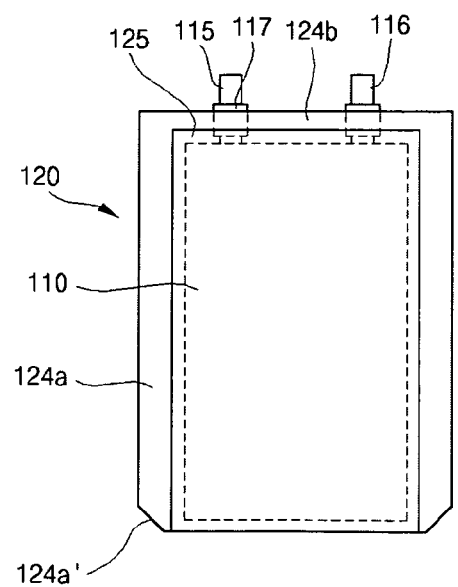
Figure 4B:
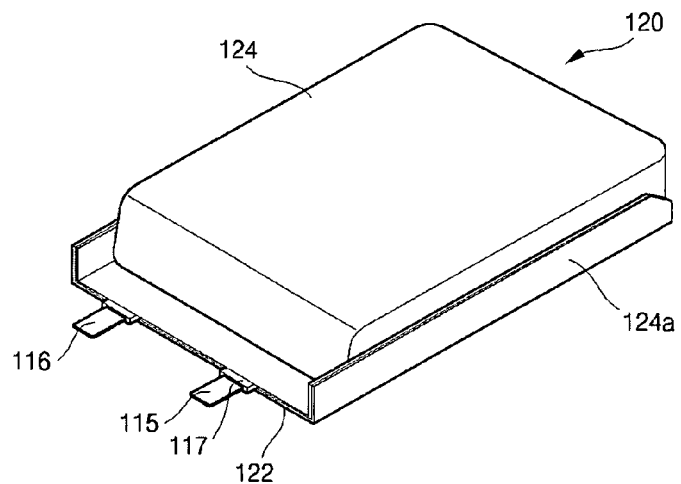

Referring to FIG. 4a and FIG. 4b, the first end portions 124a' of the side sealing sections 124a may be multilateral, such as chamfered at an angle of 45°, for example. In this case, the first end portions 124a' of the side sealing sections 124a may be formed in a smooth angular shape when the side sealing sections 124a are folded towards both sides of the case body 124. This configuration prevents the battery pack from being scratched or dented by the first end portions 124a' of the side sealing sections 124a.

Figure 5:
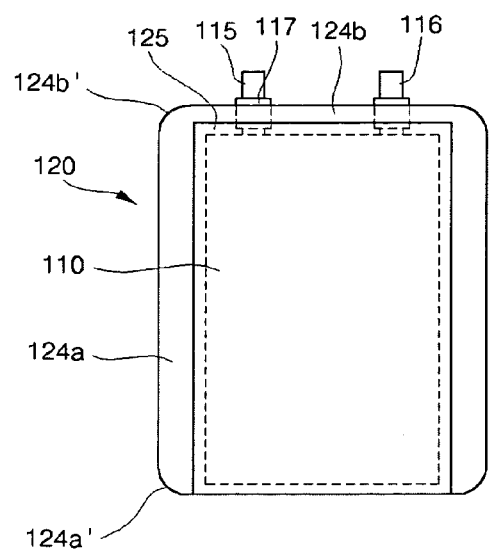
Figure 6:
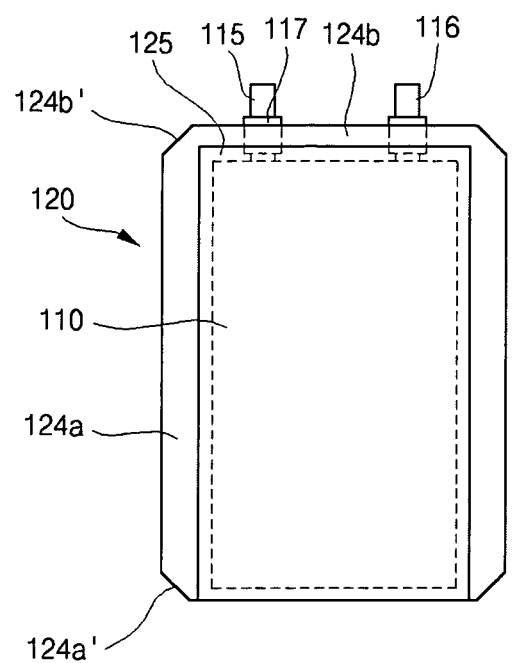

Referring to FIG. 5 and FIG. 6, the first end portions 124a' of the side sealing sections 124a and the second end portions 124b' of the side sealing section 124a can be curved or multilateral, such as chamfered at an angle of 45°.

The pouch case 120 of the pouch type rechargeable battery of the present invention may be fabricated using a laminated sheet structure comprising a thermal adhesive layer, a thin metal layer, and a polymer layer. The thermal adhesive layer is an innermost layer of the case body 124 and may comprise but is not limited to a modified polypropylene such as casted polypropylene (CPP), or a terpolymer of polypropylene-butylene-ethylene. When applying heat to the sealing sections 124a and 124b so that the case body 124 makes contact with the case cover 122, the thermal adhesive layers of the sealing sections 124a and 124b are is thermally bonded to each other so that the pouch case 120 is sealed.

A thin metal layer of the pouch case 120 may comprise aluminum, for example and is used to prevent water from penetrating into the pouch case and to prevent the electrolyte from being leaked from the pouch case. The polymer layer forms side portions of the pouch case 120 while protecting the thin metal layer. The polymer layer may comprise a resin material, such as nylon or polyethylene-terephthalate.

The laminated sheet structure of the pouch case 120 may further comprise an additional thermal adhesive layer that is formed between the thin metal layer and the polymer layer.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A pouch case, comprising:
a case body comprising a space formed thereon for receiving an electrode assembly therein and a sealing part formed around the space; and
a case cover attached to the case body through the sealing part,
wherein the sealing part comprises side sealing sections that are folded towards the space,
wherein a width of each side sealing section is less than a depth of the space,
wherein one side of the case cover is integrally formed to one side of the case body such that the one side of the case cover extends from but does not overlap with the one side of the case body, and
wherein end corners of the side sealing sections are one of curved and multilateral, the end corners being adjacent to an edge where the side of the case cover is integrally formed with the one side of the case body.

2. The pouch case of claim 1,
wherein the width of the side sealing section is at most two-thirds (⅔) of the depth of the space.

3. The pouch case of claim 1,
wherein the width of the side sealing section is at most one half (½) of the depth of the space.

4. The pouch case of claim 1,
wherein the width of the side sealing section is at most one quarter (¼) of the depth of the space.

5. The pouch case of claim 1,
wherein end corners of the side sealing sections are one of curved and multilateral, the end corners being adjacent to an edge opposite to the edge where the side of the case cover is integrally formed with the one side of the case body.

6. The pouch case of claim 1, further comprising a sheet comprising a first thermal adhesive layer, a thin metal layer, and a polymer layer.

7. The pouch case of claim 6,
wherein the first thermal adhesive layer comprises cast polypropylene.

8. The pouch case of claim 6,
wherein the first thermal adhesive layer comprises terpolymer of polypropylene-butylene-ethylene.

9. The pouch case of claim 6,
wherein the thin metal layer comprises aluminum.

10. The pouch case of claim 6,
wherein the polymer layer comprises nylon or polyethylene-terephthalate.

11. The pouch case of claim 6, further comprising:
a second thermal adhesive layer that is formed between the thin metal layer and the polymer layer.

12. A pouch type rechargeable battery, comprising:

an electrode assembly comprising a first electrode, a second electrode, and a separator that is interposed between the first electrode and the second electrode and the pouch case of claim 1.

13. A pouch type rechargeable battery, comprising:

an electrode assembly comprising a first electrode, a second electrode, and a separator that is interposed between the first electrode and the second electrode;

a case body comprising a space formed thereon for receiving an electrode assembly therein and a sealing part formed around the space; and a case cover attached to the case body through the sealing part, wherein the sealing part comprises side sealing sections that are folded towards the space, wherein a width of each side sealing section is less than a depth of the space, wherein one side of the case cover is integrally formed to one side of the case body such that the one side of the case cover extends from but does not overlap with the one side of the case body, and wherein end corners of the side sealing sections are curved, the curved end corners being adjacent to an edge where the side of the case cover is integrally formed with the one side of the case body.

14. A pouch type rechargeable battery, comprising:

an electrode assembly comprising a first electrode, a second electrode, and a separator that is interposed between the first electrode and the second electrode;

a case body comprising a space formed thereon for receiving an electrode assembly therein and a sealing part formed around the space; and a case cover attached to the case body through the sealing part, wherein the sealing part comprises side sealing sections that are folded towards the space, wherein a width of each side sealing section is less than a depth of the space, wherein one side of the case cover is integrally formed to one side of the case body such that the one side of the case cover extends from but does not overlap with the one side of the case body, and wherein end corners of the side sealing sections are multilateral, the multilateral end corners being adjacent to an edge where the side of the case cover is integrally formed with the one side of the case body.

\* \* \* \* \*